Figure 1:
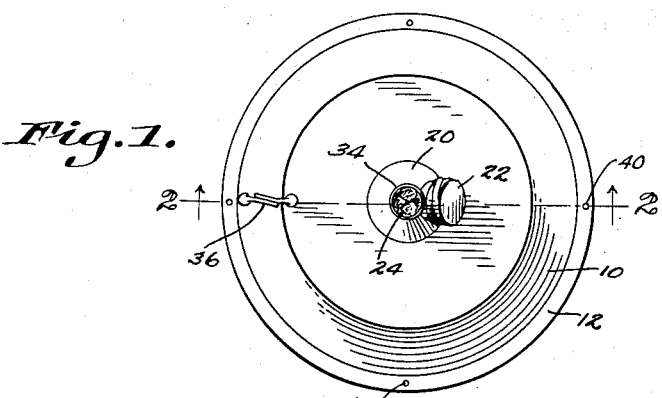

March 20, 1956    L. O. REED    2,738,609

ILLUMINATED FISHING FLOAT

Filed March 6, 1952

Inventor

*Lawrence O. Reed*

By *CA Snow & Co.*

Attorneys.

United States Patent Office 2,738,609
Patented Mar. 20, 1956

2,738,609

ILLUMINATED FISHING FLOAT

Lawrence O. Reed, St. Joseph, Mo.

Application March 6, 1952, Serial No. 275,117

3 Claims. (Cl. 43—17.5)

This invention relates to an illuminated fishing float by which a fisherman may conduct his fishing activities after dark.

It is well known that fish are attracted to a source of illumination after the fall of darkness and fishing lamps of various types have been employed in the past in conducting such fishing operations. In most instances however the fishing lamps are carried upon the fishing boats occupied by the fishermen and owing to the vibrations produced by a boat being propelled through a body of water there is a tendency to frighten the fish.

The primary object of this invention is to illuminate an area of the water at a point distant from the location of the fisherman so as to avoid frightening the fish and at the same time obtain the benefits of illumination after the fall of darkness.

Another object is to attract to the bait carried by the float the fish in a body of water, and to illuminate the surrounding portion of the water to render the bait readily visible to the fish.

The above and other objects may be attained by employing this invention which embodies among its features a hollow substantially disk-shaped buoyant body forming a fuel reservoir, a tubular stem carried by the body and extending axially from one side thereof, said stem communicating with the interior of the body, a hollow stem carried by the body and projecting from the side thereof opposite that carrying the tubular stem said hollow stem aligning axially with the tubular stem and communicating with the interior of the body to form a fuel receiving well, a wick extending through the tubular stem and entering the well, means carried by the body for coupling fish hooks thereto and means carried by the body for coupling a fishing line thereto.

Figure 2:
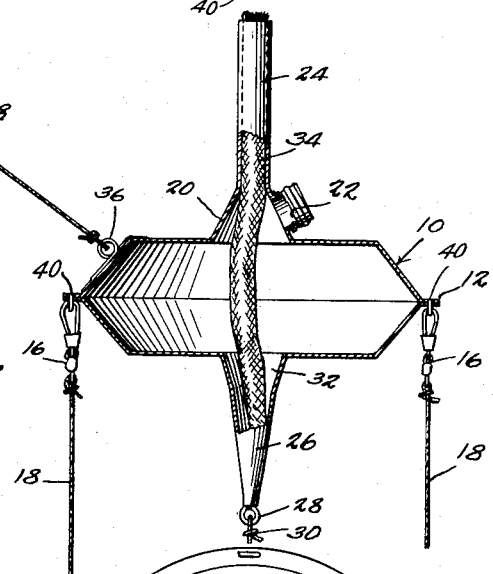
Figure 3:
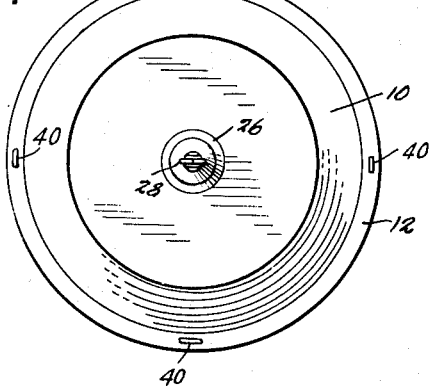

In the drawings,

Fig. 1 is a top plan view of a fishing float embodying the features of this invention, Fig. 2 is a vertical sectional view taken substantially along the line 2—2 of Fig. 1, the control line and hook connecting leaders being shown, and Fig. 3 is a bottom plan view of the float illustrated in Fig. 1 the control line and leaders being omitted.

Referring to the drawings in detail a hollow substantially disk-shaped body designated generally 10 is provided adjacent its periphery with an outstanding annular flange 12 carrying at peripherally spaced intervals swivels 16 to which leaders 18 may be attached which in turn carry fish hooks (not shown) upon which bait may be secured. Carried by and extending upwardly from the hollow body 10 is a frusto-conical shaped member 20 having formed therein a filling opening 22 and carried by the upper end of the inverted frusto-conical member 20 is an elongated vertically extending tubular stem 24. The interior of the stem communicates with the interior of the inverted conical member 20 which in turn communicates with the interior of the hollow body 10.

Secured to the hollow body 10 on the side thereof opposite the inverted frusto-conical member 20 is a substantially hollow conical member 26 which aligns axially with the tubular stem 24 and carries at its lower end an eye 28 to which an anchor cord 30 may be attached. The upper larger end of conical member 26 opens into the body 10 to form in conjunction therewith a fuel receiving well 32. A wick 34 extends through the tubular stem 24 and into the well 32 so that when the body 10 is filled through the filling opening 22 with a liquid fuel, such as kerosene, the wick will be impregnated therewith and by applying a match to the upper end of the wick which projects through the upper end of the tubular stem 24, the wick may be ignited. If the wick 34 is not used, then the end of stem 24 should be closed by a plug as of cork, rubber or wood. This will render the device suitable for day use.

Carried by the body 10 between the frusto-conical member 20 and the outstanding flange 12 is an eye 36 to which a fishing control line 38 may be attached.

In use the body 10, partially filled with a suitable liquid fuel and having coupled thereto by the swivels 16, the leaders 18 of fish hooks, is placed on the surface of a body of water and the body 10 will float on the surface thereof with the member 26 projecting downwardly. The leaders 18 carrying hooks are connected to the eyes 40 and disposed in depending position from body 10. By coupling the anchor line 30 to the eye 28, the device may be confined to a limited area of the body of water upon which it floats and with the upper end of the wick ignited, a relatively large area of the surface of the body of water will be illuminated to attract fish to the bait carried by the hooks. With the body 10 coupled to a fishing control line 38 through the medium of the eye 36, it will be evident that when a fish grabs a hook and endeavors to run with it, the body will move with the fish paying out the line 38 from the fisherman's reel and by playing the fish, it may be eventually landed. The rapid movement of the illuminated float across the surface of the water enables the fisherman to follow the movements of the fish so that he may employ his best skill in completing the catch. For day use, and especially if the user has no fuel oil available, the wick may be dry and porous; the wick can then be removed and the stem 24 closed with a plug or stopper. This excludes water from the interior.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A fish lure comprising an illuminated float including a hollow substantially disk shaped buoyant body forming a fuel reservoir, a tubular stem carried by the body and extending axially from the upper side thereof, said stem communicating with the interior of the body, a hollow stem carried by the body and projecting from the side thereof opposite that carrying the tubular stem, said hollow stem aligning axially with the tubular stem and communicating with the interior of the body to form a fuel receiving well on the bottom of said float, a wick extending through the tubular stem and entering the well, means carried by the body for coupling fish hooks thereto, and means carried by the body on one side for coupling a fishing control line thereto.

2. A fish lure comprising an illuminated float including a hollow substantially disk shaped buoyant body forming a fuel reservoir, a tubular stem carried by the body and extending axially from one side thereof, said stem communicating with the interior of the body, a hollow stem carried by the body and projecting from the side thereof opposite that carrying the tubular stem, said hollow stem aligning axially with the tubular stem and communicating with the interior of the body to form a fuel receiving well, a wick extending through the tubular stem and entering the well, means carried by the body for coupling fish hooks thereto, means carried by the body on one side for coupling a fishing control line thereto, and an eye carried by the hollow stem at the end thereof remote from the body for coupling an anchor to the body and thereby balance said float in a body of water.

3. The device of claim 2, in which a flexible line for supporting a weight or anchor is attached to the eye.

References Cited in the file of this patent

UNITED STATES PATENTS

| | | |
|---|---|---|
| 194,421 | Egloff | Aug. 21, 1877 |
| 195,313 | Tamagno | Sept. 18, 1877 |
| 237,777 | Robins | Feb. 15, 1881 |
| 405,786 | Ludde | June 25, 1889 |
| 653,617 | Climenson et al. | July 10, 1900 |
| 2,070,755 | Seigle et al. | Feb. 16, 1937 |
| 2,272,802 | High et al. | Feb. 10, 1942 |
| 2,559,084 | McGlade | July 3, 1951 |